No. 733,835. PATENTED JULY 14, 1903.
B. B. GRAY.
LUMBER SEASONING APPARATUS.
APPLICATION FILED OCT. 9, 1902.
NO MODEL. 4 SHEETS—SHEET 1.
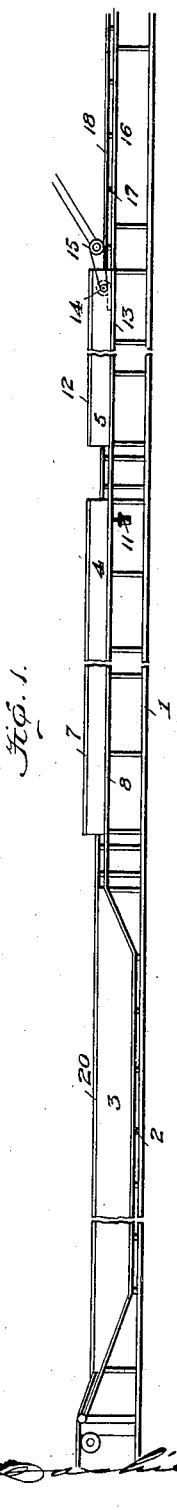
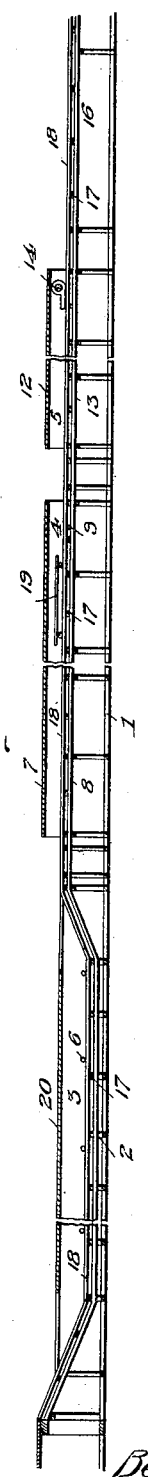
Witnesses —
Inventor —
Benjamin B. Gray
By
David P. Moore
Atty.

No. 733,835. PATENTED JULY 14, 1903.
B. B. GRAY.
LUMBER SEASONING APPARATUS.
APPLICATION FILED OCT. 9, 1902.
NO MODEL. 4 SHEETS—SHEET 2.
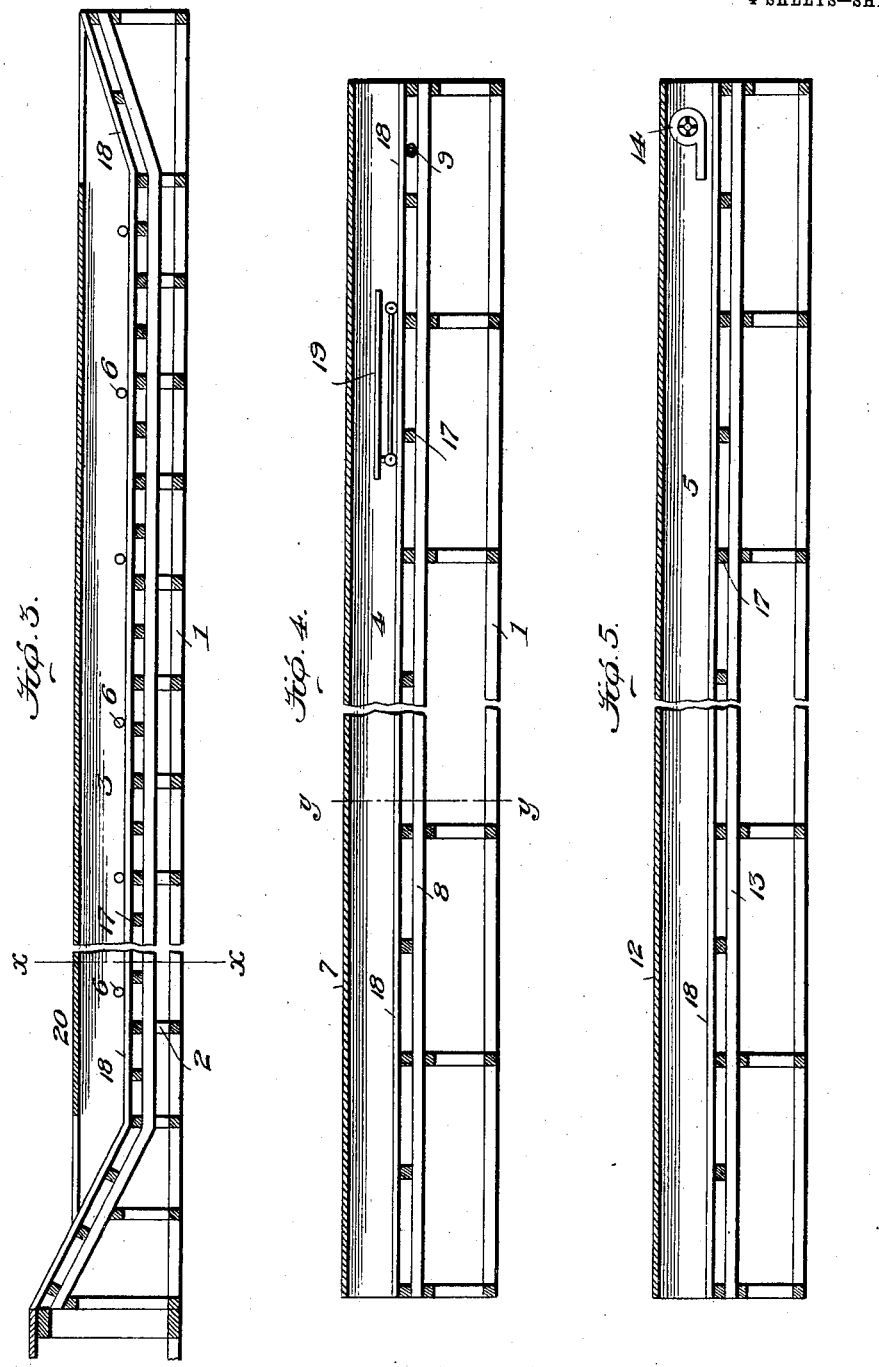
Witnesses
Inventor
Benjamin B. Gray
By
Atty No. 733,835. PATENTED JULY 14, 1903.
B. B. GRAY.
LUMBER SEASONING APPARATUS.
APPLICATION FILED OCT. 9, 1902.
NO MODEL. 4 SHEETS—SHEET 3.
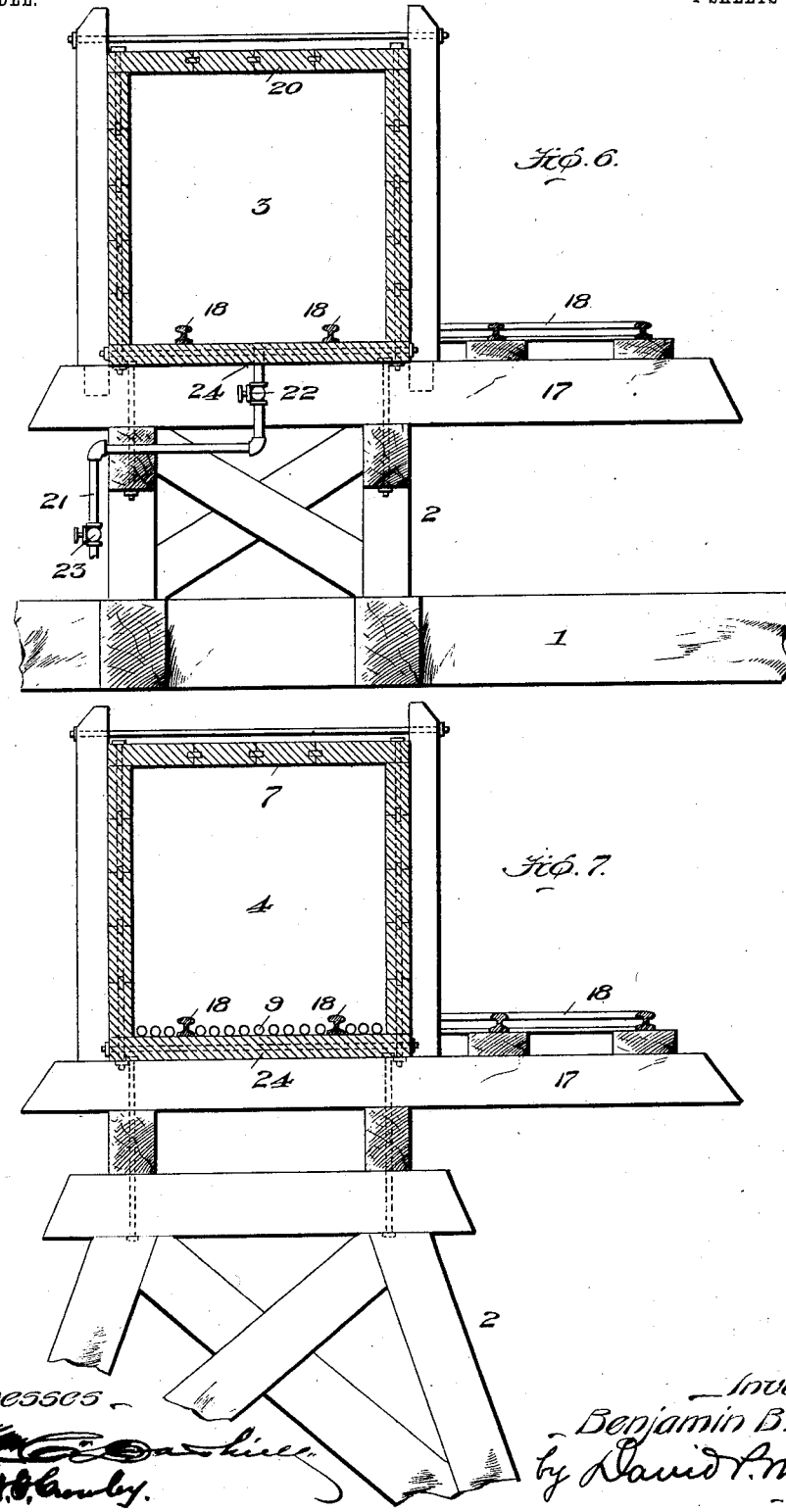
Witnesses
Inventor
Benjamin B. Gray
by David P. Moore.
Atty.

No. 733,835. PATENTED JULY 14, 1903.
B. B. GRAY.
LUMBER SEASONING APPARATUS.
APPLICATION FILED OCT. 9, 1902.
NO MODEL. 4 SHEETS—SHEET 4.
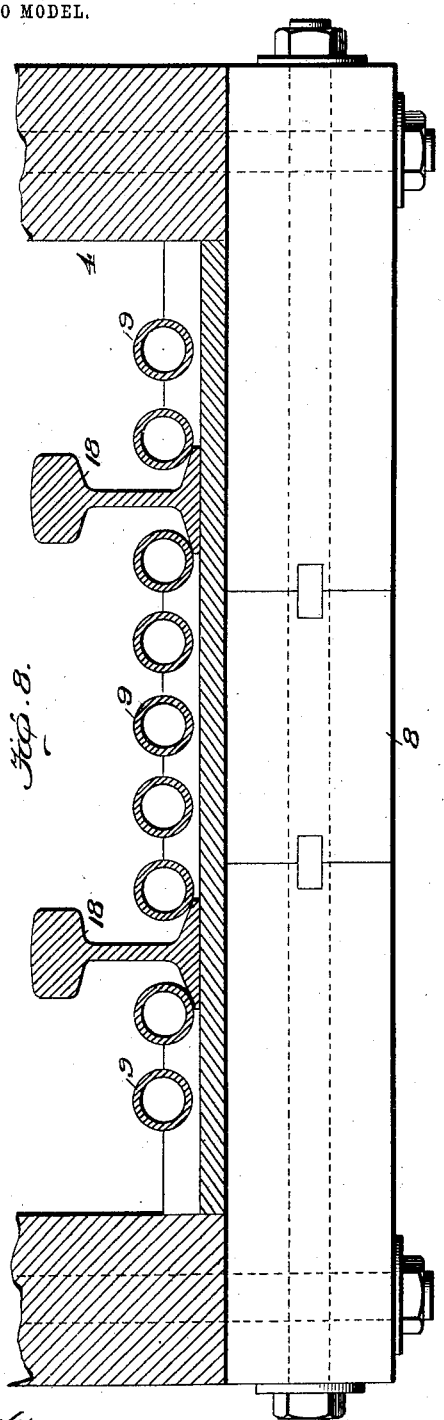
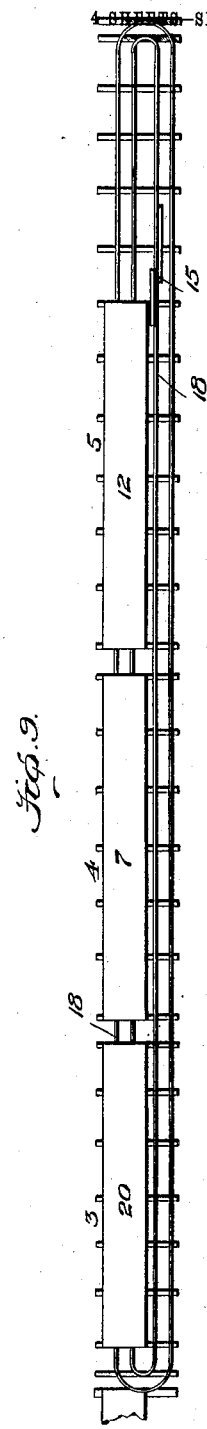
Witnesses
W. G. Crowley.
Inventor
Benjamin B. Gray.
David P. Moore, Atty.

No. 733,835. Patented July 14, 1903.

UNITED STATES PATENT OFFICE.

BENJAMIN B. GRAY, OF PINEBLOOM, GEORGIA.

LUMBER-SEASONING APPARATUS.

SPECIFICATION forming part of Letters Patent No. 733,835, dated July 14, 1903.

Application filed October 9, 1902. Serial No. 126,552. (No model.)

*To all whom it may concern:*

Be it known that I, BENJAMIN B. GRAY, a citizen of the United States, residing at Pinebloom, in the county of Coffee and State of Georgia, have invented certain new and useful Improvements in Lumber-Seasoning Apparatus, of which the following is a specification.

This invention relates to improvements in lumber-seasoning apparatus; and the main object of my invention is the provision of an apparatus by which green lumber, or substantially green, is placed in the apparatus in one end and as it comes out of the other end of the apparatus it is cooled and thoroughly seasoned. The operation, taken in all, occupies a very short time as compared to most ways of seasoning generally used.

Another object of my invention is the provision of a lumber-seasoning apparatus which is simple and durable in construction and thoroughly efficient and practical in use.

To attain the desired objects, the invention consists of an apparatus for seasoning lumber embodying novel features of construction, substantially as disclosed herein.

In the accompanying drawings, Figure 1 is a side elevation of my apparatus greatly reduced to show the entire apparatus in operative position. Fig. 2 is a longitudinal sectional view thereof. Fig. 3 is a longitudinal sectional view of the boiling-tank enlarged. Fig. 4 is a similar view of the drying-chamber. Fig. 5 is a sectional view of the cooling-chamber. Fig. 6 is a cross-section taken on line $x\,x$ of Fig. 3. Fig. 7 is a sectional view similar to that of Fig. 6, taken on line $y\,y$ of Fig. 4. Fig. 8 is an enlarged section showing the rails and steam-pipes of the drying-chamber. Fig. 9 is a top plan view of the entire apparatus.

Referring to the drawings, the numeral 1 designates the base-line for the entire construction, upon which is mounted a suitable framework 2 for the boiling-tank 3, the drying-chamber 4, and the cooling-chamber 5. The boiling-tank is provided with the steam-inlet pipes 6 in order that the water contained therein may be kept at the boiling-point. The drying-chamber consists, substantially, of the three-walled shed or casing 7, having the floor 8, upon which is suitably mounted a series of heating-fluid pipes 9, said fluid being preferably steam. These pipes are slightly inclined from the forward end of the chamber to the rear end in order that the condensed steam or water may flow out at the steam-trap 11, and thus always allowing the free circulation of the steam through the pipes. The drawings being made on such small scale, the slight inclination of the pipes is not perceptible, as this chamber is generally made from two hundred to six hundred feet long and the pipes are inclined just enough to allow the fluid to flow therethrough, so that they will not become clogged when the steam condenses. I prefer to use a series of substantially independent pipes; but I do not limit myself to them, for a worm or coil of pipes could be used with some satisfaction. The cooling-chamber comprises substantially a three-walled shed or compartment 12, having a bottom 13. Mounted in the rear end of said chamber, so as to cause a draft and to direct a blast through the chamber toward the front, is a rotary blower or fan 14, which is provided with and operated by a suitable mechanism 15 from any desired source. The beams 16, which are directly below the tank and chambers, project upon one side thereof and have mounted thereon cross-ties or rail-supports 17 for the tracks or rails 18, which are made continuous, so that they pass through the tank and chambers and around to the side thereof in an opposite direction, so that they are ready after being loaded with lumber at the forward end of the apparatus to be conveyed into the boiling-tank, where they remain for about two hours, after which they are removed upward and onward into the drying-chamber, remaining there about nine hours, thus thoroughly drying all of the moisture left in the lumber after the boiling operation, but being at such a high degree of temperature that they have to pass into the cooling-chamber, where the lumber is properly cooled. At the outer end of this chamber the lumber is removed from the car 19, and the car is allowed to proceed upon the outer tracks, to be loaded again with the unseasoned lumber. This process of seasoning lumber is more particularly described and claimed in my application for patent, filed of even date herewith, Serial No. 126,551.

In order that the residue may be removed from the boiling-tank, which, by the way, is provided with a cover 20, it is provided with an outlet-pipe 21, which is provided with a cut-off 22 near the bottom of the tank and another cut-off 23. I use this construction so that the cut-off 22 may be used and allow the withdrawal of all the residue from the pipes when it is desired to thoroughly clean the same. In order to facilitate the cleaning of the same, the bottom 24 of the boiling-tank is very slightly inclined toward the outlet-pipe 21, so that the residue will settle toward that end and be easily withdrawn from the tank. The inclination of the bottom is not perceptible in the drawings, as the boiling-tank is generally made six hundred feet long.

From the foregoing description, taken in connection with the drawings, it is evident that I provide a lumber-seasoning apparatus which is thoroughly efficient and practical in use and by the use of which the length of time required in seasoning lumber is greatly reduced and the process of seasoning lumber materially simplified.

What I claim as new is—

1. In a lumber-seasoning apparatus, the combination of a boiling-tank, a drying-chamber, a cooling-chamber, and a continuous track passing through the boiling-tank, drying-chamber, cooling-chamber and returning upon the outside from the cooling-chamber to the boiling-tank.

2. In a lumber-seasoning apparatus, the combination of a boiling-tank, a drying-chamber, a cooling-chamber and continuous tracks passing through the tank and chambers and around upon the outside thereof and lumber-carrying cars mounted on said track.

3. In a lumber-seasoning apparatus, the combination of an inclosed boiling-tank, an inclosed drying-chamber in communication therewith, and an inclosed cooling-chamber in communication with the opposite end of the drying-chamber, and a continuous track passing through the tank and both chambers and returning upon the outside from the cooling-chamber to the boiling-tank.

4. In a lumber-seasoning apparatus, the combination of an inclosed boiling chamber or tank, an inclosed drying-chamber in communication therewith, a heating mechanism mounted upon the bottom of the drying-chamber, a cooling-chamber at the opposite end of the drying-chamber, and a continuous track passing through the tank and both chambers and returning upon the outside from the cooling-chamber to the boiling-tank.

5. In a lumber-seasoning apparatus, the combination of a boiling-tank, a drying-chamber having mounted therein heating apparatus, a cooling-chamber in communication therewith provided with means for cooling the chamber, and a continuous track passing through the tank and both chambers and returning upon the outside from the cooling-chamber to the tank.

6. In a lumber-seasoning apparatus, the combination of a boiling-tank having means for boiling water therein, a drying-chamber having means for heating the same, a cooling-chamber having means for cooling the same, a continuous track passing through the tank and chambers and returning upon the outside thereof, and lumber-carrying cars adapted to move upon said tracks.

7. In a lumber-seasoning apparatus, the combination of a tank having inclined runways at its exit and entrance, a cover for the tank, a drying-chamber at the exit end of the tank, a cooling-chamber at the exit end of the drying-chamber, and a continuous track passing through the tank and the two chambers and returning also upon the outside of the tank and chambers.

8. In a lumber-seasoning apparatus, the combination of a boiling-tank, a drying-chamber and a cooling-chamber all located upon substantially the same plane and arranged end to end, and a continuous track passing from the boiling-tank and both chambers and returning upon the outside from the cooling-chamber to the boiling-tank.

9. In a lumber-seasoning apparatus, the combination of a boiling-tank having entrance and exit inclining downwardly from above, a drying-chamber having its bottom above the bottom of the tank, a cooling-chamber having its bottom in the same line with the bottom of the drying-chamber, the tank and both chambers being mounted upon the same longitudinal framework, and a continuous track passing through the tank and both chambers and returning upon the outside from the cooling-chamber to the tank.

10. In a lumber-seasoning apparatus, the combination of a boiling-tank having inclined entrance and exit leading from above, a cover for the tank, a covered drying-chamber contiguous to the exit of the boiling-tank, a covered cooling-chamber contiguous to the exit of the drying-chamber, all of said elements being arranged in the same straight line, and a continuous track passing through the tank and both chambers and returning upon the outside from the cooling-chamber to the tank.

11. In a lumber-seasoning apparatus, the combination of a longitudinal framework, a boiling-tank arranged at one end, a drying-chamber arranged intermediate of the ends, a cooling-chamber arranged at the opposite end, and a continuous track mounted in the tank and both chambers and returning upon the framework to one side of the tank and both chambers.

12. In a lumber-seasoning apparatus, the combination with a boiling-tank having an inclined entrance and exit leading from above, and a drying-chamber contiguous with the exit of the boiling-tank provided with means for drying the lumber after it leaves the boiling-tank, of a continuous track passing through the boiling-tank and drying-chamber and returning upon the outside to the boiling-tank.

In testimony whereof I affix my signature in presence of two witnesses.

BENJAMIN B. GRAY.

Witnesses:
J. S. BURNS,
C. A. DAVIS.